Oct. 28, 1941.  M. R. SCOTT  2,260,342
MULTIFLAME WELDING TIP
Filed June 28, 1939
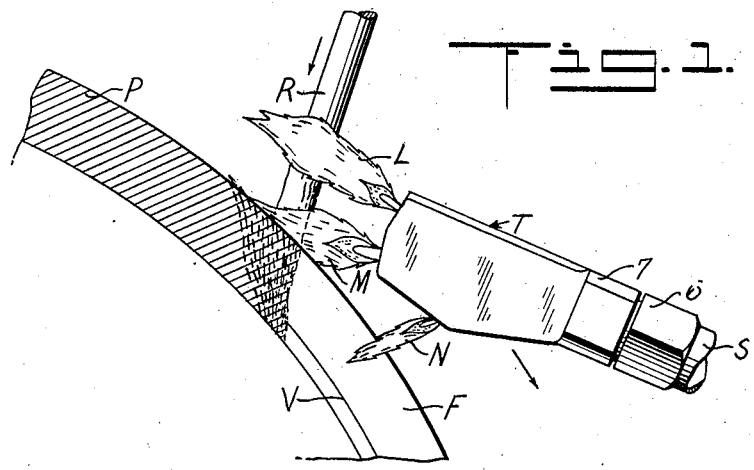
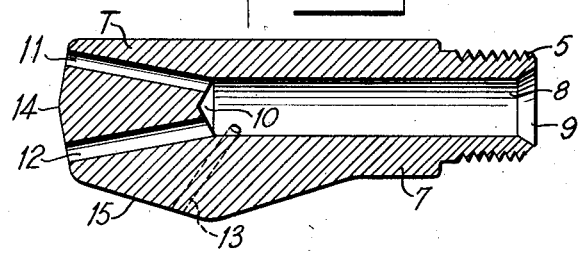
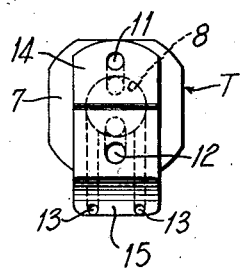
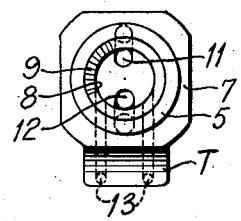
INVENTOR
MARVIN R. SCOTT
BY
ATTORNEY Patented Oct. 28, 1941

2,260,342

UNITED STATES PATENT OFFICE 2,260,342

MULTIFLAME WELDING TIP

Marvin R. Scott, Cleveland, Ohio, assignor to Oxweld Acetylene Company, a corporation of West Virginia Application June 28, 1939, Serial No. 281,661

8 Claims. (Cl. 158—27.4)

This invention relates to gas welding and more particularly to position welding of metal work surfaces arranged to form a groove, such as a V.

In the oxyacetylene position welding of ferrous metal pipe lines, the line is assembled a length at a time, with the end surfaces to be welded beveled to form a circumferential groove of V cross section. The procedure usually followed is to line up the pipe on skids over the ditch, after which the joints are tack-welded and then welded without turning the pipe. This presents a special problem and slows up the welding operation considerably, because the molten weld metal tends to flow in the V under the action of gravity particularly at the sides of the circumferential groove and even out of the V at the lower half of such groove.

Such problem was partially solved and the art greatly advanced by the use of back-hand welding with a carburizing welding flame, the blowpipe and welding rod being held so that the welding flame pointed back at the completed weld with the rod disposed between the weld and the flame. A 70° included angle in the V was made possible by such technique. The weld was started at the top of the joint and the puddle of weld metal advanced to the bottom; then the weld was restarted at the top and advanced down the other side to complete the operation. In order to control the advancing puddle in the V it was necessary to manipulate the blowpipe and the welding rod while carefully watching the progress of the weld to properly sweat the walls of the V and preheat the rod. Because of the many variables involved, a single flame was generally used by welders for this type of welding, so that the amount of gas consumed and the time required to make such welds were standardized, notwithstanding attempts to decrease the gas consumption and increase the speed of welding the same.

Therefore, the main objects of this invention are to provide an improved multi-flame tip for position welding ferrous metal pipe parts the ends of which have surfaces arranged to form a circumferential welding groove, such as a V; means for increasing the speed and reducing the gas consumption of back-hand position welding, especially in vertical and overhead work; and means for decreasing the amount of weld metal required to be added to complete the weld.

Briefly, the foregoing objects are accomplished by the use of a multi-flame welding tip comprising a solid metal body having a central cylindrical chamber terminating in a conical bottom surface, a rod preheating jet passage extending from one side of said bottom surface, a main welding jet passage extending from the other side of said bottom surface, and a pair of work preheating jet passages extending from the opposite side walls of said cylindrical chamber. These four jet passages are so arranged and proportioned according to this invention that it is possible to position weld a circumferential V having a smaller included angle, faster and more economically than with a single flame tip.

The multi-flame tip of this invention especially is adapted to be attached to the stem of a conventional oxyacetylene blowpipe for manual operation in position welding; although it will be understood that other welding gases may be employed, if desired, and the tip also may be used for rolling or machine welding where applicable.

Referring to the drawing:

Fig. 1 is a fragmentary view in side elevation of a welding tip embodying features of this invention and illustrating the tip in use, the tip being shown in full-size scale;

Fig. 2 is a view of the welding tip in longitudinal cross-section, the scale being 50 per cent larger than full size; and Figs. 3 and 4 are, respectively, front and rear elevational views of the welding tip, the scale being the same as that of Fig. 2.

The multi-flame welding tip T is adapted to be attached to the tubular stem S of a conventional blowpipe adapted to supply a combustible mixture containing a fuel and a combustion-supporting gas, such as acetylene and oxygen, for example. To secure the tip T in place, it is provided with an externally threaded rear end portion 5 for connection with an internally threaded coupling nut 6 swiveled on the stem S; the outer portion 7 of the tip ahead of the threads 5 being substantially squared to fit a wrench. The tip T preferably comprises a one-piece body of solid metal, such as copper, the outer surface of which is chromium plated.

The body of the tip T is provided with a single central cylindrical gas distributing chamber 8 extending forwardly from the rear end 9 of the tip and longitudinally thereof. The chamber 8 terminates in a conical bottom surface 10 from the opposite sides of which extend a pair of outlet passages 11 and 12 diverging at substantially equal angles to the longitudinal axis of the chamber 8. The passages 11 and 12 diverge at an included angle of about 20° and are of substantially equal length and terminate in the front end face 14 of the tip. The centers of the outer ends of the passages 11 and 12 are spaced about 1/16 inch from each other, as shown. The diameters of both passages 11 and 12 are much smaller than that of the chamber 8, and the passage 11 preferably is only slightly smaller in cross section than the passage 12. The longitudinal axes of the chamber 8 and the passages 11 and 12 are disposed substantially in a single plane extending centrally and longitudinally of the tip.

Equally spaced from opposite sides of such central plane are a pair of identical parallel outlet passages 13, 13 which extend outwardly from opposite sides of the wall of the cylindrical chamber 8. The entrances of the passages 13, 13 are located some distance back of the chamber bottom 10, and these passages terminate in the bottom face 15 of the tip, spaced about 1/4 inch from each other and at a distance of about 5/8 inch from the outer end of the main welding gas outlet passage 12, as shown. The passages 13, 13 are considerably smaller in cross-sectional area than the passages 11 and 12, and lie in a common plane which intersects the longitudinal axis of the chamber 8 at an included angle of about 55°, making an angle of about 45° with the axis of the main welding gas outlet passage 12.

Thus, when an oxyacetylene gas mixture is supplied to the chamber 8 through the blowpipe stem S, and the resulting jets discharged by the outlet passages 11, 12 and 13, 13 are ignited, four flames are produced: a main welding flame M from the passage 12, a rod preheating flame L from the passage 11, and a pair of parallel work preheating flames N, N from the passages 13, 13. For the carburizing flame welding of ferrous metal, the flames are adjusted with enough excess acetylene to provide a feather of about one and one-half times the length of the inner cone. If this adjustment is made with the main welding flame M as a guide, the other flames will be correct.

In the position welding of substantially horizontal ferrous metal pipe parts P having end surfaces F arranged to form a circumferential groove, such as a V V, the blowpipe should be held with the central longitudinal plane, which includes the axes of the chamber 8 and passages 11 and 12, of the tip T, coinciding with the plane, which includes the line of the weld, and with the welding flame M pointing to the base of the V V. Then, with the welding flame M maintained in this position and with its inner cone barely out of contact with the metal, the blowpipe should be rotated in the plane of the weld until the inner cones of the V-preheat flames N, N are just above the metal. This automatically brings the rod preheat flame L into correct position to act upon the lower end portion of a rod R of weld metal being fed into the V V. The preheating jet for the rod R is so located that the operator has control of the amount of the rod preheated and melted regardless of the point of welding.

In welding, practically all the rod and blowpipe movement is confined to a back-and-forth accordion motion along the line of the weld, with little or no motion transverse to the line of welding. Although actual melting of the rod R is completed by the main welding flame M, the auxiliary flame L normally and preferably preheats the rod R sufficiently to develop a visible red. The rate at which the rod is melted is controlled by varying this preheating action through movement of either the rod R or the tip T, one relatively to the other.

After the welding operation is under way, both hands should move in the accordion motion, one moving the tip T so as to prepare the V and melt the rod R alternately, and the other moving the rod in the puddle so as to direct the flow of molten metal. Since less of the welding flame M is required to melt the rod R, more can be used to prepare the V, thus increasing the welding speed. The technique is essentially the same for successive positions around the pipe P except that the rate at which the rod R is melted is changed as necessary. The preferred procedure is to start at the top of the joint and weld continuously around half the pipe to the lowest point, then start again at the top and weld progressively around the other half of the pipe to complete the weld.

The following Table I indicates what has been accomplished in making position welds according to this invention.

Table I

| Pipe diameter | Wall thickness | Included angle of V | Rod per weld | Oxygen per weld | Time per weld |
|---|---|---|---|---|---|
| Inches | Inches | Degrees | Pounds | Cubic feet | Minutes |
| 6 | 0.250 | 60 | 0.38 | 8 | 4 |
| 8 | 0.250 | 60 | 0.45 | 11½ | 6 |
| 8 | 0.375 | 50 | 0.87 | 16 | 8 |
| 12 | 0.250 | 60 | 0.80 | 17 | 9 |
| 12 | 0.312 | 50 | 0.90 | 19 | 10 |
| 16 | 0.250 | 60 | 1.00 | 21 | 11 |
| 20 | 0.250 | 60 | 1.25 | 26 | 13 |

For pipe diameters below six inches and for wall thickness less than 1/4 inch, the four-flame tip of this invention may be used for both position and rolling welds, as shown by the following Table II.

Table II

| Pipe diameter | Wall thickness | Time per rolling weld | Time per position weld |
|---|---|---|---|
| Inches | Inches | Minutes | Minutes |
| 2 | 0.185 | 1 | 1¼ |
| 2½ | 0.250 | 1¾ | 2 |
| 3 | 0.250 | 2 | 2¼ |
| 4 | 0.250 | 2½ | 3 |

In comparative laboratory tests, the use of the multi-flame welding tip of this invention has shown an increase in welding speed of 31 to 65 per cent over the appropriate or recommended size of conventional single flame tip for position welding. Also, the invention has made it possible to position weld pipe faster and more economically than with the customary single flame tip, a result long sought but never before accomplished prior to this invention. The invention also makes it possible to reduce the included angle of the V to 60° and in some cases even to 50°. This results in a stronger joint after welding, the use of less weld metal, faster welding and less gas consumption. The transverse movement of the tip and rod is also reduced or practically eliminated which, in turn, results in still faster welding and further gas economy. The rod also may be fed continuously and steadily into the welding zone, because it is progressively preheated to a red heat. This relieves the operator of worry about any other movement of the rod, except the accordion movement which is naturally coordinated with a matching and opposite movement of the tip. Also, the tip of this invention, although capable of producing four flames, is light in weight, a decided advantage in blowpipes that are wholly supported by one hand of the operator.

What is claimed is:

1. A multi-flame welding tip adapted to be attached to the stem of a blowpipe utilizing a combustible gas mixture in the back-hand position welding of metal parts having surfaces arranged to form a welding groove, such as a V, within which molten weld metal tends to flow downwardly under the influence of gravity ahead of the welding operation and, in some cases, out of the groove entirely, said tip comprising a unitary metal body having: a single cylindrical gas inlet chamber extending into said body from the rear end of the tip and terminating within said body in an inner end surface spaced from the front end of said tip, a pair of divergent rod preheating and main welding gas outlet passages extending from opposite sides of said inner end surface to the front end of the tip, the axes of said passages being disposed in a common plane, said passages diverging at an included angle of about 20° and being of substantially equal length, the centers of the outer ends of said passages being spaced about $\frac{7}{8}$ inch from each other, one of said passages being adapted to discharge a preheating flame generally upwardly against a rod of weld metal being fed generally downwardly into such V, the other passage being adapted to discharge a main welding flame against weld metal to restrain and maintain the same in a welding state as the weld advances downwardly along the V, and a pair of work preheating gas outlet passages disposed in substantially equally spaced relation to said plane and extending from said chamber to the bottom surface of said tip, at an angle of about 45° to said main welding gas outlet passage, for discharging a preheating flame against each of the inner surfaces of such metal parts in the V in advance of and below the main welding operation, the outer ends of said pair of work-preheating gas outlet passages being spaced about ¼ inch from each other and about ⅝ inch from the outer end of said main welding gas outlet passage.

2. A multi-flame welding tip as claimed by claim 1, wherein the said inner end surface of said gas inlet chamber is conical, the rod preheating gas outlet passage is only slightly smaller in cross section than the main welding gas outlet passage, and the pair of work preheating gas outlet passages are parallel to each other and to said plane.

3. A multi-flame welding tip as claimed by claim 1, in which said work preheating gas outlet passages have their axes disposed in a common plane which is at right angles to the common plane including the axes of said rod preheating and main welding gas outlet passages.

4. A multi-flame welding tip as claimed by claim 1, in which the combustible gas mixture comprises a combustible gas and a combustion-supporting gas, such as acetylene and oxygen, respectively, and said rod preheating and main welding gas outlet passages are of substantially equal cross section.

5. Multi-flame position welding tip means comprising, in combination, a gas inlet chamber terminating in an inner surface, rod preheating gas passage means and welding gas passage means extending from said inner surface, the angle between said passage means being about 20° with their outer ends spaced about $\frac{7}{8}$ inch from each other, and a pair of work preheating gas passage means extending from opposite sides of said gas inlet chamber, said work preheating gas passage means being spaced at their outer ends about ¼ inch from each other, and the angle between said work preheating gas passage means and said welding gas passage means being about 45° with a spacing between their outer ends of about ⅝ inch.

6. Multi-flame pipe-position welding tip means comprising, in combination, a gas inlet chamber, diverging rod preheating and welding gas passage means extending from said chamber, the included angle between said diverging passage means being of the order of 20° with their outer ends spaced about $\frac{7}{8}$ inch from each other, and a pair of work preheating gas passage means extending from said gas inlet chamber at an angle of the order of 45° to said welding gas passage means with their outer ends spaced about ⅝ inch from the outer ends of said welding gas passage means.

7. A four flame position welding tip comprising, in combination, means for discharging one rod preheating flame, two work preheating flames, and one central welding flame, said means being constructed and arranged so that said rod preheating flame diverges at an angle of the order of 20° from said welding flame and is spaced a little less than ½ inch above said welding flame, and said work preheating flames are spaced below and to the rear of said welding flame at a distance of a little more than ½ inch and at an angle of the order of 45° with respect thereto.

8. A multi-flame welding tip adapted to be attached to the stem of a blowpipe utilizing a combustible gas mixture in the back-hand position welding of metal parts having surfaces arranged to form a welding groove, such as a V, within which molten weld metal tends to flow downwardly under the influence of gravity ahead of the welding operation and, in some cases, out of the groove entirely, said tip comprising a unitary metal body having: a single cylindrical gas inlet chamber extending into said body from the rear end of the tip and terminating within said body in an inner end surface spaced from the front end of said tip, a pair of divergent rod preheating and main welding gas outlet passages extending from opposite sides of said inner end surface to the front end of the tip, the axes of said passages being disposed in a common plane, said passages diverging at an acute included angle and one of said passages being adapted to discharge a preheating flame generally upwardly against a rod of weld metal being fed generally downwardly into such V, the other passage being adapted to discharge a main welding flame against weld metal to restrain and maintain the same in a welding state as the weld advances downwardly along the V, and a pair of work preheating gas outlet passages disposed in substantially equally spaced relation to said plane and extending from said chamber to the bottom surface of said tip, at an angle to said main welding gas outlet passage, for discharging a preheating flame against each of the inner surfaces of such metal parts in the V in advance of and below the main welding operation.

MARVIN R. SCOTT.